United States Patent
Mizen et al.

[11] 3,768,606
[45] Oct. 30, 1973

[54] SURGE BRAKE WITH SOLENOID-ACTUATED MASTER CYLINDER LOCK AND EMERGENCY RELEASE

[75] Inventors: Walter J. Mizen; Richard L. Lewis; Richard T. Hendrickson, all of South Bend, Ind.

[73] Assignee: The Bendix Corporation, South Bend, Ind.

[22] Filed: June 29, 1972

[21] Appl. No.: 267,300

[52] U.S. Cl. .............................................. 188/112
[51] Int. Cl. .............................................. B60t 7/20
[58] Field of Search ........................... 188/3 H, 112; 280/428; 303/7

[56] References Cited
UNITED STATES PATENTS
3,570,633   3/1971   Garnett .............................. 188/112
2,229,499   1/1941   Fisette .............................. 188/112

Primary Examiner—Duane A. Reger
Attorney—Ken C. Decker et al.

[57] ABSTRACT

A surge-type brake actuator is disclosed which includes a pair of relatively movable members which cooperate with one another to apply the brakes of a towed vehicle when the towed vehicle moves relative to the towing vehicle when the brakes of the latter are applied. The actuator includes a preloaded spring which cooperates with one of the members to urge the latter relative to the other member, and a latching mechanism which normally prevents the spring from generating this relative movement. The latching mechanism is controlled by a solenoid actuator which is wired to the towing vehicle's stop light switch so that the latching mechanism is released whenever the operator of the towing vehicle initiates a brake application. A manual control may also be provided in the operator's compartment of the towing vehicle so that the solenoid actuator may also be controlled at the discretion of the driver to permit the preloaded spring to apply the towed vehicle's brakes a very small amount even if the towing vehicle's brakes are released. The latching mechanism includes structure which is responsive to the force generated due to attempted relative movement between the members to permit application of the towed vehicle's brakes even when the latching mechanism is engaged when the force generated by attempted relative movement between the vehicles exceeds a predetermined amount.

10 Claims, 1 Drawing Figure

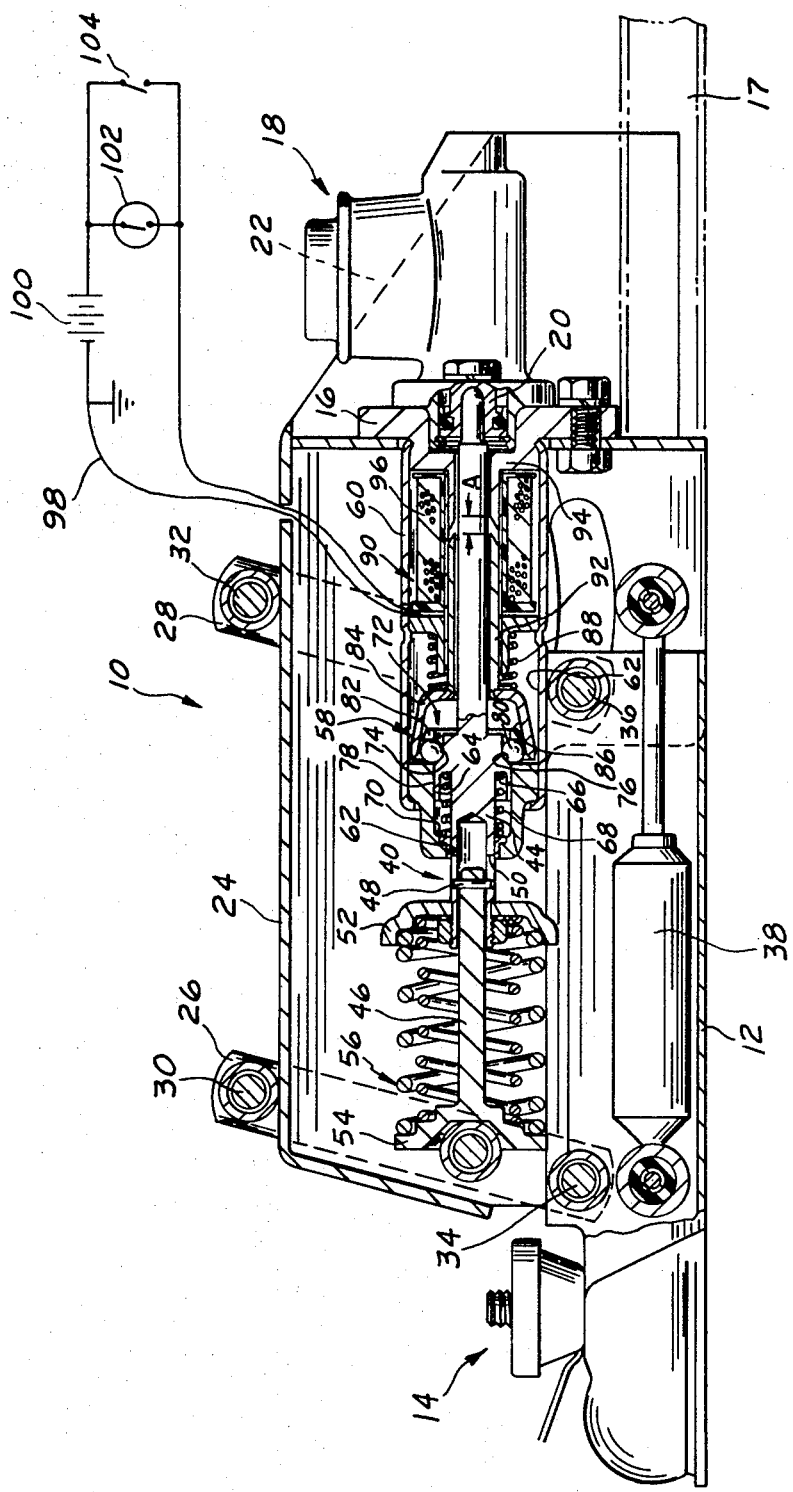

SURGE BRAKE WITH SOLENOID-ACTUATED MASTER CYLINDER LOCK AND EMERGENCY RELEASE

BACKGROUND OF THE INVENTION

This invention relates to a surge brake actuator for actuating the brakes of a towed vehicle in response to actuation of the brakes of the towing vehicle.

As is well known to those skilled in the art, when a vehicle towing a trailer is decelerated, the trailer tends to move toward or "overrun" the towing vehicle. Trailer brake actuators which make use of this "overrunning" effect, known as surge-brake actuators, have been commercially available for many years and have, in general, provided quite satisfactory control of the brakes of the trailer. However, surge brake actuators also suffer from many deficiencies. For example, since trailer brake pressure is created whenever the towed vehicle moves toward the towing vehicle, brake pressure is created when the vehicle combination is backed up, particularly when the trailer is tracking up a slope. While this deficiency may be overcome by use of less effective brakes, this solution is self defeating, since towing a trailer in today's crowded traffic conditions demands more effective, instead of less effective brakes. Another difficulty with surge trailer brake actuators is that trailer braking pressure can be created by the surge actuator while the vehicle combination is coasting down steep hills where, in effect, the trailer pushes the towed vehicle. The trailer may then decelerate momentarily until the hitch forces revert to normal tension. The cycle then repeats itself causing uneven brake wear and in some instances the decelerating influence of the trailer can be felt by the driver of the towing vehicle. Response time of trailer brake actuators in the past has been notoriously slow, since the towing vehicle must decelerate before the trailer brakes are applied. Conversely, it is theoretically desirable that the trailer brakes be applied before the brakes of the towing vehicle are applied to avoid jackknifing. Still another problem encountered in any trailer towing situation is a condition known as "trailer sway," that is, transverse relative movement of the towed vehicle relative to the towing vehicle, as most often occurs during a passing maneuver or when rather windy conditions exist.

SUMMARY OF THE INVENTION

Therefore, an important object of our invention is to provide an improved surge trailer brake actuator which permits the vehicle combination to be backed up without applying the trailer's brakes.

Still another important object of our invention is to prevent generation of braking pressure due to relative movement of the trailer with respect to the towing vehicle while the vehicle combination is coasting down a steep hill.

Still another important object of our invention is to decrease the response time required to apply the trailer's brakes after the brakes of the towing vehicle are applied.

A still further object of our invention is to provide a surge brake actuator which may be controlled by the vehicle operator in order to inhibit trailer sway.

DESCRIPTION OF THE DRAWINGS

The sole FIGURE of the drawings is a view, partly in section, of a surge brake actuator made pursuant to the teachings of our present invention in which the electrical connections between the actuator and the towing vehicle are illustrated schematically.

DETAILED DESCRIPTION

Referring now to the drawings, a surge brake actuator generally indicated by the numeral 10 includes a structural number 12 which carries a conventional ball and socket type hitch 14 which is adapted to couple the member 12 onto a towing vehicle. A second member 16 is carried on the towed vehicle or trailer 17 (shown in phantom) and supports a standard automotive master cylinder generally indicated by the numeral 18. The master cylinder 18 is of the single-system type and includes a single piston 20 which is adapted to pressurize fluid carried in a reservoir 22 in the conventional manner well known to those skilled in the master cylinder art. The outlet ports of the master cylinder 18 are communicated to the trailer brakes (not shown) which are actuated by the fluid pressure developed in the master cylinder 18. A housing 24 is also connected to the member 16 and is connected to the member 12 by a pair of links generally indicated by the numerals 26 and 28, respectively. First pivots 30, 32 connect one end of the links 26 and 28, respectively, to the housing 24, and second pivots 34, 36 connect the opposite ends of the links 26 and 28, respectively, with the structural member 12. It will therefore be noted that the links 26 and 28 which pivotally interconnect the housing 24 and the member 12 permit the structural member 16 to move relative to the structural member 12 when the trailer or towed vehicle moves relative to the towing vehicle. A shock absorber generally indicated by the numeral 38 is connected between the members 12 and 16 to dampen road vibrations which would otherwise be transmitted through the surge brake mechanism 10.

The master cylinder 18 is actuated by an actuating rod generally indicated by the numeral 40. The actuating rod 40 is provided with a pair of telescoping sections which includes a first section 44 slidably receiving a second section 46. A detent cross pin generally indicated by the numeral 48 is provided on the section 46, and is received within a slot 50 provided in section 44, so that, when the telescoping section 42 is fully extended, the engagement of the detents 48 with the end of the slot 50 permits movement of the entire rod 40 with the links 26 as the latter pivot about the pivots 30 and 34 in the counterclockwise direction. First and second spring retainers 52, 54 are carried by the sections 44 and 46 respectively, and spring means generally indicated by the numeral 56 are disposed between the retainers 52 and 54 and yieldably urge the detent 48 toward the end of the slot 50. Spring means 56 also serves to absorb small amounts of the actuating rod 40 so that the small movements due to road shock and bumps, etc., will not be transmitted to the master cylinder 18. This, in conjunction with the shock absorber 38, prevents the generation of small braking impulses due to the aforementioned road shocks and bumps when the vehicle is traversing a relatively rough terrain and the brakes of the vehicle are released.

The surge actuator 10 includes a control mechanism generally indicated by the numeral 58 which includes a housing 60 which extends from the structural member 16. The housing 60 defines a bore 62 extending therethrough which slidably receives a section 44 of the actuating rod 40. A sleeve 64 is secured to the rod 40 within the housing 60 for movement with the rod 40 and cooperates with the latter to define a shoulder 66 therebetween. A preloaded spring 68 is compressed between the shoulder 66 and another shoulder 70 formed on the wall of the housing 60. Because the spring 18 is normally compressed when the brakes of both the towed and towing vehicles are released, the spring 68 exerts a force on the actuating rod 40 tending to urge the latter to the right, viewing the FIGURE, to thereby develop a minimum brake actuation pressure in the master cylinder 18. The extent of this movement is limited by the engagement of the detent 48 with the end of slot 50, but is normally sufficiently great to develop a pressure level in the master cylinder 18 which is sufficient to urge the brake shoes of the trailer brakes (not shown) into light engagement with the drums. However, movement of the rod 40 relative to the master cylinder 18 due to either the resiliency of the spring 68 or to movement of the trailer toward the towing vehicle is normally inhibited by a locking mechanism generally indicated by the numeral 72. Locking mechanism 72 includes reduced diameter portion 74 on the outer circumferential surface of the sleeve 64 which is provided with a sloping ramp surface 76 extending from the portion 74 toward the relatively flat portion of the outer circumferential surface 78 of the sleeve 64. The reduced diameter portion 74 receives spherical force transmitting elements 80. A retainer 82 retains the force transmitting elements 80 on the sleeve 64; however, vertical movement of each of the force transmitting elements 80 for a distance equal to the depth of the reduced diameter portion 74 is permitted for a purpose to be described in detail hereinafter. A cup-like retaining structure generally indicated by the numeral 84 is slidably mounted within the housing 60 and is movable from a first position illustrated in the drawings in which the sloping inner surface 86 of the member 84 is slidably engaged with a portion of the surface of the spherical force transmitting elements 80 as illustrated in the drawing to a second position in which the member 84 is disposed away from the members 80. A spring 88 is provided which urges the structure 84 to the first position. As can be seen from the drawings, when the retaining structure 84 is disposed in the first position, the movement of the actuating rod 40 relative to the housing 60 is prevented unless sufficient force is generated between the rod 40 and housing 60 sufficient to urge the spheres 80 up the ramp surfaces 76 and on to the surface 78 of the sleeve 64. As is evident to those skilled in the art, the force level required to urge the spheres 80 up the ramp surface 76 is dependent upon the angle of the ramp surface 76 and also upon the angle of the sloping surface 86 of the retaining structure 84. Since the design criteria for locking structures of this type are well known to those skilled in the art, having been fully disclosed in U. S. Pat. No. 3,438,399, owned by the assignee of the present invention and incorporated herein by reference, further details of the locking structure will not be described.

The cup-like retaining structure 84 is moved from the first position illustrated in the drawings to the second position disposed away from the force-transmitting elements 80 by an electrical solenoid generally indicated by the numeral 90. The cup-like structure 84 is mounted on the armature 92 of the solenoid 90, which is normally spaced a distance equal to the air gap A from the solenoid core piece 94. Since, as shown, the actuating rod 40 extends through the armature 92 and the core piece 94, the actuating rod 90 must be manufactured from a non-magnetic material. The solenoid coil 96 circumscribes the core piece 94 and a portion of the armature 92 and is adapted, when an electrical current is passed through the coil 96, to move the armature 92 toward the core piece 94, thereby reducing the length of the air gap A. The leads 98 extending from the coil 96 are wired to the vehicle's battery 100, and to the vehicle's stop light switch 102. Another switch 104, which is wired in parallel to the stop light switch 102, is mounted in a position where the switch 104 is easily accessible to the operator of the towing vehicle. Therefore, an electric current will be passed through the coil 96 when either the vehicle's stop light switch 102 is actuated or when the manually actuated switch 104 is actuated.

MODE OF OPERATION

The various components of the surge brake actuator 10 are illustrated in the drawings in the positions which they assume when the brakes of both the towing vehicle and the towed vehicle or trailer are released. In this position, the locking mechanism 72 prevents relative movement between the actuating rod 40 and the master cylinder 18 as described hereinabove. Therefore, substantially no pressure is generated in the master cylinder 18 and the brakes of the vehicle remain in the released position. However, when the operator of the towing vehicle initiates a brake application, the stop light switch 102 is closed immediately so that a current will be passed through the coil 96 of the solenoid 90. When this occurs, the cup-shaped structure 84 is moved to the second position, away from the force-transmitting elements 80, to thereby permit the preloaded spring 68 to urge the actuating rod 40 toward the master cylinder 18, thereby generating pressure in the latter sufficient to urge the brake shoes of the trailer brakes (not shown) into light frictional engagement with the rotating drums thereof. As the towing vehicle continues to decelerate, the trailer will move toward the towing vehicle, since the force generated by the aforementioned light contact by the shoes against the drum is insufficient to quickly reduce the speed of the trailer. Upon relative movement of the trailer with respect to the towing vehicle, the links 26 and 28 pivot about the pivots 34 and 36, respectively. Although the actuating rod 40 is attached to the link 26, it moves a substantially shorter distance relative to the structural member 12 than does the master cylinder 18, since the lever arm between the point of attachment of the rod 40 to the link 26 is much closer to the pivot 34 than is the pivot 30 in which the housing 28, and therefore the structural member 16 and master cylinder 18, are attached to the links 26. Therefore, relative movement occurs between the rod 40 and the master cylinder 18, so that the piston 20 of the latter is urged to the right, viewing the FIGURE, thereby increasing the fluid pressure level generated in the master cylinder. This fluid pressure level, of course, is communicated to the brakes of the towed vehicle, further actuating the latter. Since the extent of relative movement between the trailer and the towing vehicle is dependent upon the deceleration of the latter, the braking effect on the trailer brakes will be proportional to this deceleration. Furthermore, since the brakes of the trailer are actuated a small amount immediately when the stop light switch 102 is actuated, the undesirable time lag between actuation of the towing vehicle's brakes and actuation of the trailer brakes inherent in surge brake mechanisms known to the prior art is reduced in the present design. When the brakes of both vehicles are released and hitch forces revert to normal, rod 40 is moved to the left viewing the FIGURE, to again compress the spring 68.

Although normally no relative movement between actuating rod 40 and master cylinder 18 can occur unless the solenoid 90 is actuated, when the force due to attempted relative movement between the member 40 and the master cylinder 18 is sufficiently great that the spheres 80 are urged up the ramp surfaces 76, such relative movement can occur even though the cup-shaped member 84 remains disposed in the first position as illustrated in the drawings. This feature provides "fail-safe" operation in case a malfunction should occur in the solenoid 90 which would prevent any actuation of the brakes of the trailer. Although the force level required to disengage the force-transmitting elements 80 from their recesses 74 must be low enough to protect the vehicles against damage, it must be high enough so that the normal movement of the trailer with respect to the towing vehicle, such as occurs when the vehicle combination is traveling down a steep grade or when the vehicle combination is backed up, the sphere 80 will remain on the portion 74 so that the locking mechanism 72 prevents any actuation of the trailer's brakes.

The switch 104 is optionally provided so that the vehicle operator may independently actuate the solenoid 90 to permit the spring 68 to generate a small braking force in the trailer brakes even when the brakes of the towing vehicle are released. This is particularly desirable in case the brakes of the towing vehicle should fail so that a minimum level of braking will be available, although this minimum level will be small. Manual control of the solenoid 90 by the switch 104 is also desirable to inhibit trailer "sway" or relative lateral trailer movement with respect to the towing vehicle. When trailer "sway" occurs, the vehicle operator may briefly actuate the trailer's brakes by using the switch 104 even when the brakes of the towing vehicle are released entirely, thereby retarding and correcting trailer "sway."

We claim:

1. In a brake control device for actuating the brakes of a towed vehicle in response to actuation of the brakes of a towing vehicle:

brake-applying means responsive to relative movement between said vehicles to apply the brakes of the towed vehicle upon movement of said towed vehicle toward said towing vehicle; and control means normally inhibiting said brake-applying means to prevent actuation of the brakes of the towed vehicle, said control means being releasable upon initiation of a brake application by the operator of the towing vehicle to permit actuation of the brakes of the towed vehicle;

said control means including locking means normally preventing actuation of said brake-applying means and an actuator for releasing said locking means; and an energy storage device connected to said brake-applying means for operating the latter upon release of the locking means;

said actuator being actuated by initiation of a brake application of the towing vehicle whereby actuation of the brakes of the towing vehicle permits said energy storage device to apply the brakes of the towed vehicle to a first predetermined level even in the absence of relative movement between the towed vehicle and the towing vehicle, and subsequent relative movement between the towing vehicle and the towed vehicle actuates the brakes of the latter by an additional amount.

2. The invention of claim 1; and means actuated by the operator of the towing vehicle to operate said actuator whereby the brakes of the towed vehicle may be actuated when the brakes of the towing vehicle are released.

3. In a brake control device for actuating the brakes of a towed vehicle in response to actuation of the brakes of a towing vehicle;

brake-applying means responsive to relative movement between said vehicle to apply the brakes of the towed vehicle upon movement of said towed vehicle toward said towing vehicle; and control means normally inhibiting said brake-applying means to prevent actuation of the brakes of the towed vehicle, said control means being releasable upon initiation of a brake application by the operator of the towing vehicle to permit actuation of the brakes of the towed vehicle;

said brake-applying means including a pair of relatively movable members, said members moving relative to one another upon relative movement between the vehicles to apply the brakes of said towed vehicle;

said control means including locking means normally preventing relative movement between said members, and actuating means actuatable in response to initiation of a brake application of the towing vehicle to release said locking means to permit relative movement between said members.

4. The invention of claim 3;

one of said relatively movable members including a fluid pressure generating device communicated to the brakes of the towed vehicle.

5. The invention of claim 3; and an energy storage device operably connected to one of said members for applying the brakes of the towed vehicle upon actuation of said actuating means to release said locking means.

6. The invention of claim 5:

said locking means releasing to permit relative movement between said members in the absence of actuation of said actuating means when the force generated by attempted relative movement between said members exceeds a predetermined amount.

7. The invention of claim 5:

said energy storage means having a preload of predetermined magnitude yieldably urging said members relative to one another, said locking means normally preventing relative movement between said members due to the preload of said energy storage means; and means operable by the operator of the towing vehicle to actuate said actuating means to release said locking means to permit the preload of said energy storage means to actuate the brakes of the towed vehicle.

8. The invention of claim 5:

said energy storage means having a preload of predetermined magnitude yieldably urging siad members relative to one another, said locking means normally preventing relative movement between said members due to the preload of said energy storage means, whereby the brakes of the towed vehicle are applied by an amount governed by the preload of the energy storage means immediately upon initiation of a brake application of the towing vehicle and before the towing vehicle has decelerated sufficiently to permit the towed vehicle to move relative to the towing vehicle.

9. The invention of claim 6:

said locking means including a recess carried by one of said members, a force transmitting member disposed in said recess, and structure carried with the other member and movable in response to actuation of said actuating means from a first position in which said structure engages said force transmitting element to thereby lock said one member against movement relative to the other member to a second position disengaged from said force transmitting member to permit relative movement between said members;

said force transmitting element being urged out of said recess to permit relative movement between said members when the force generated by attempted relative movement between said members exceeds a predetermined level.

10. The invention of claim 1:

said energy storage device being a preloaded spring.

* * * * *